US006625328B2

United States Patent
Kling

(10) Patent No.: US 6,625,328 B2
(45) Date of Patent: Sep. 23, 2003

(54) TEXT-MOIRE' MINIMIZATION

(75) Inventor: Carl C. Kling, Cos Cob, CT (US)

(73) Assignee: Anvik Corporation, Hawthorne, NY (US)

( * ) Notice: Subject to any disclaimer, the term of this patent is extended or adjusted under 35 U.S.C. 154(b) by 14 days.

(21) Appl. No.: 10/033,037

(22) Filed: Dec. 27, 2001

(65) Prior Publication Data

US 2003/0122308 A1 Jul. 3, 2003

(51) Int. Cl.[7] .............................. G06K 9/40; G06K 9/32; G06K 9/00
(52) U.S. Cl. ........................ 382/275; 382/301; 382/111; 382/254; 382/296; 382/163
(58) Field of Search ................................. 382/275, 301, 382/111, 254, 296, 163; 358/463, 536; 400/76

(56) References Cited

U.S. PATENT DOCUMENTS

| | | | | |
|---|---|---|---|---|
| 3,742,129 A | * | 6/1973 | Roberts et al. | 358/534 |
| 4,420,175 A | * | 12/1983 | Mowry, Jr. | 283/93 |
| 4,456,924 A | * | 6/1984 | Rosenfeld | 358/536 |
| 4,916,545 A | * | 4/1990 | Granger | 358/3.26 |
| 5,224,208 A | * | 6/1993 | Miller et al. | 345/609 |
| 5,323,247 A | * | 6/1994 | Parker et al. | 358/3.08 |
| 6,480,623 B1 | * | 11/2002 | Yagishita et al. | 382/163 |

OTHER PUBLICATIONS

IBM Technical Disclosure Bulletin, Eliminating Optical Effects in Computer Printing, May 1989, pp 35–39.*

* cited by examiner

Primary Examiner—Andrew H. Hirshfeld
Assistant Examiner—Wasseem H. Hamdan
(74) Attorney, Agent, or Firm—Carl C. Kling

(57) ABSTRACT

Pixel-level monitoring and reconfiguring of both text inter-word spacing and individual character widths minimizes undesirable moire' channels and moire'-glyphs, and more particularly relates to operator-selected automatic intra-word space manipulation and automatic intra-character width manipulation to achieve a pleasing overall page effect with maximized freedom from moire'-maze and moire'-glyph visual effects, both in proportional spaced fonts and fixed-character-width fonts. Selective scrolling may be by black-spot instead of actual characters, to make the white moire'-effects stand out more clearly. The typesetter may alternate positive and negative, which is another way to emphasize the moire'-effects. A further sub-variant, called "blush," causes graying of spaces which are so surrounded by characters that they cannot participate in moire'-effects. This emphasizes the actual moiré-effects. The typesetter may "unselect," by pointing a cursor at a moire'-effect and key + or − to accept the particular moire'-effect as benign, or to proceed with an amelioration procedure.

9 Claims, 1 Drawing Sheet

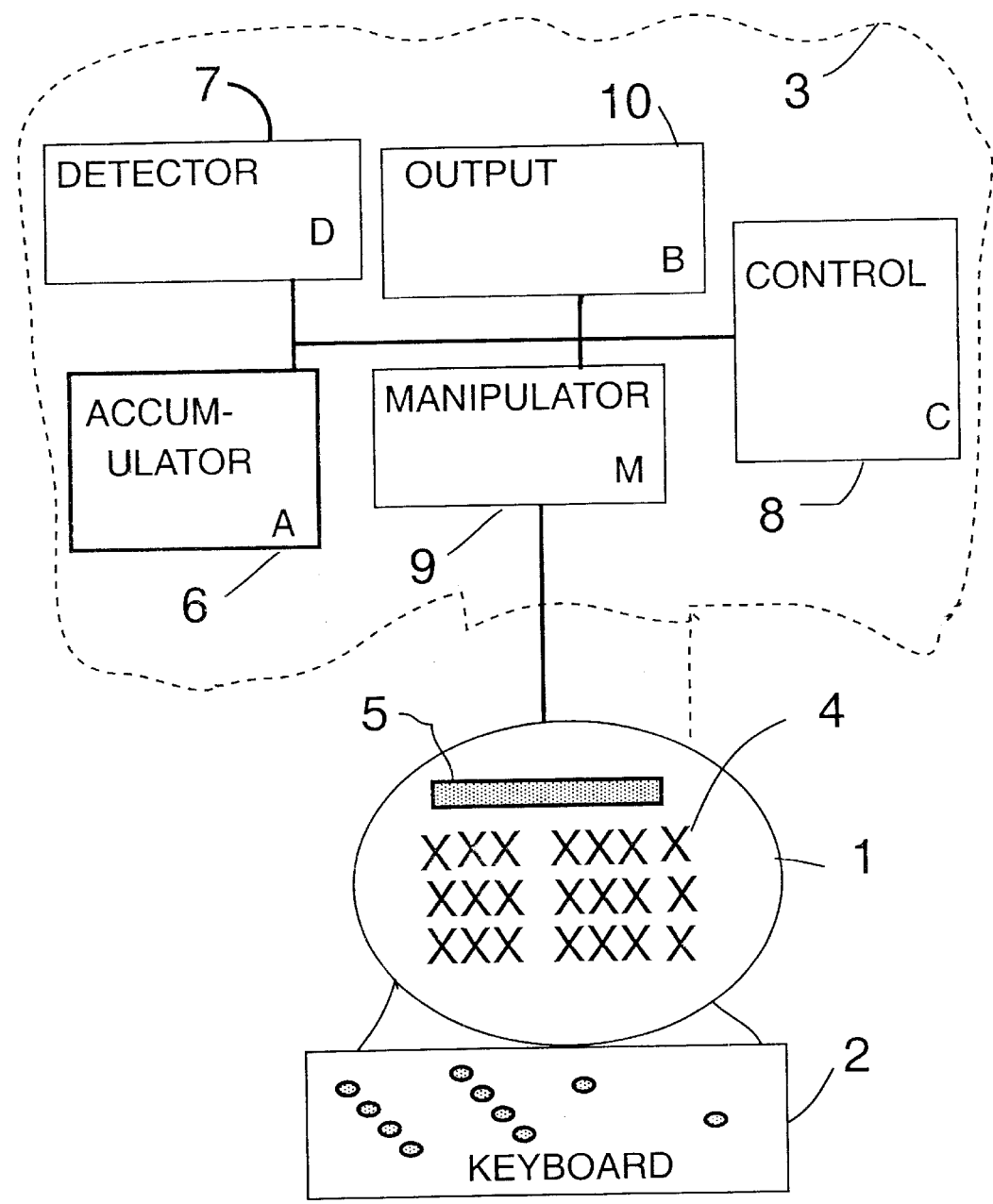

TEXT-MOIRE' MINIMIZATION

BACKGROUND OF THE INVENTION

1. Field of the Invention

This invention relates to a blend of automatic and interactive pixel-level control of incipient text-moire' in a developing page of computerized print by pixel-level virtual typesetting, with reconfiguring of text inter-word spacing, character widths and inter-character spacing within a word, to reposition inter-word white space in text for minimized moire'-effects such as vertical and diagonal channels, mazes and glyphs. The invention more particularly relates to operator-selected automatic intra-character width manipulation and intra-word space relocation to achieve a pleasing overall page effect by minimizing text-moire' effects.

2. Description of Related Art

A paragraph of printed text appears in gross as a block of gray made up of lines of black characters with a number of spots of white space, and a rather subliminal raster of horizontal white bars between the lines of black. The reader is accustomed to these inter-line horizontal white bars, and indeed is comforted by them as he scans down the page of mostly-black lines of print, separated from other black lines of print by the horizontal white bars. The reader's comfort level is diminished by the interruptions of occasional vertical or diagonal straight or vermiform white channels and white moire'-glyph patterns, which are usually referred to as moire'-effects or text-moire'. Moire' patterns in textiles, especially silk, are watery or wavelike patterns which may be quite pleasing to the eye, creating a shimmering effect in clothing as the wearer moves. Text-moire', however, is a different matter. Text-moire' tends to diminish the ability to read fast and comprehend well a block of text having text-moire' patterns. Text-moire' is somewhat disconcerting to most readers, and can be quite disconcerting for some readers. It slows the reader by giving the reader's eyes an excuse for distraction, and by such distractions may break the rhythm of multi-line scanning, line-by-line scanning or word-by-word scanning of a block of printed text.

A related development, by the inventor, was published in the IBM Technical Disclosure Bulletin (TDB) during the 1980's. The TDB publication manipulated inter-word spaces by monitoring each line with the previous line and repositioning some of the inter-word white spaces. The result was to randomize vertical moire'-effects. There was no pixel manipulation within individual characters and little intervention by the typesetter.

Character width in most printing has several standard modes, as follows:

SCS Standard Character Space—All characters are the same width, as in the standard typewriter. Inter-word spacing is usually the same as a character width.

PCS Proportional Character Space—Each character has its own width, with the "I" less wide than the "M." Inter-word spacing is usually the same as a wide character.

The typesetting operation has evolved, from hand-setting of hand-carved individual character types, through various hot-metal modes such as Linotype, to the current computerized virtual typesetting—pixel-to-page. In computerized virtual typesetting, the computer simulates the type-carving and type-setting by developing individual characters at the pixel level from white and black spots. Each pixel is a spot which may be white or black, and may either be close to its neighboring pixels or overlap its neighboring pixels so that the character looks as a continuously black foreground on a white background. The colors, of course, do not need to be white and black, but may be any of a great variety of available selection. The computer can thus offer a variety of typefonts in a variety of sizes. Computerized virtual typesetting can provide a full page of text, giving the typesetter prompts as to spelling, punctuation and grammar. Justified right and left margins are available. Boldface, italics and underlining are commonly available, as are certain widow, orphan and lonely line prevention aids.

Assuming, for discussion, lines of 60 character spaces averaging 10 pixel-widths each, four consecutive lines may be found to have moire'-channels as follows:

```
Xxxxxxxx xxxxxxxx xxxxxxxxx xxxxxxxx  xxxxxxxxx
Xxxxxxxxx xxxxxxxx xxxxx xxxxx xxxxxxxx xxxxxxx
Xxx xxxxxxxx xxxxxx xxxxxx  xxxxx xxxxx xxxxxxxxx
Xxxxxxxx xxxx xxxx xxxxxxxxxxx xxxxxxx xxxxxxx
```

DESCRIPTION OF THE DRAWING

The FIGURE is a semidiagrammatic view of the mechanisms for carrying out the invention.

DESCRIPTION OF THE PREFERRED EMBODIMENT

The FIGURE shows the computer functions of the invention, which jitters spaces and also jitters character width, both intra-character and inter-character, to randomize inter-word spaces and thus minimize undesired text-moire' such as the vertical white line between the X characters.

This capability may be termed as follows:

VSP Variable Spacing Pixellation—A given character, such as "M," can be laterally extended or laterally compressed, to vary slightly in width, by addition or subtraction of a column of pixels, inter-character and intra-character as well as intra-space, to minimize moire'-effects on the page my repositioning inter-word spaces.

Inter-character pixellation does not significantly change moire'-effects in any direct manner. The human eye apparently accepts a group of characters as a word unless individual characters have been outrageously deformed or the inter-character spacing has been outrageously expanded. The human eye seems to accept run-together characters, such as partial strikeovers in typing, or deliberately run-together "ff" or "tt" pairs. Moire'-effects within the word therefore seem to be benign as contrasted to moire'-effects from inter-word spaces.

It therefore is desired to minimize moire'-effects from inter-word spaces, accomplishing such minimization by pixellation intra-word—that is, by pixellation intra-character or inter-character within the word. A continuous monitor of inter-word spaces is kept in a text accumulator, for a limited number of lines, for example eight lines. Assuming, for discussion, lines of 60 character spaces averaging 10 pixels each, four consecutive lines may be found to have one or more moire'-channels as follows:

```
Xxxxxxxx xxxxxxxx xxxxxxxxx xxxxxxxx  xxxxxxxxx
Xxxxxxxxx xxxxxxxx xxxxx xxxxx xxxxxxxx xxxxxxx
Xxx xxxxxxxx xxxxxx xxxxxx  xxxxx xxxxx xxxxxxxxx
Xxxxxxxx xxxx   xxxx xxxxxxxxxxx xxxxxxx xxxxxxx
```

Vertical moire'-channels, except for four, are all blocked. The first line has a space after 8 characters, the second line after 9 characters, the third line after 12 characters and the fourth line after 14 characters, with spaces counted as if they were characters. Other channels, not so straight, appear at right. The four-line channels are not particularly objectionable, but when expanded to eight-line channels may become strange-looking, and may interfere with smooth reading. See below:

```
Xxxxxxx xxxxxxxx xxxxxxxx xxxxxxx  xxxxxxxxx
Xxxxxxxxx xxxxxxx xxxxx xxxxx xxxxxxxx xxxx xxx
Xxx xxxxxxxx xxxxxx xxxxxx xxxxxx xxxxx xxxxxxxxx
Xxxxxxxx xxxx   xxxx xxxxxxxxxxx xxxxxxx xxxxxxx
Xxxx xxxx xxx xxxxx xxxxxxxxx x xxxx  xxxxxxxx
Xxx xxxxxx xx xxxxxx xxxxx xxxx   xxxxxxx xxxxxx
Xxx xxxx xxx xxxxx xxx xxxxxx  xxxxxx xxxxx  xxxxxxx
Xxxxxxx xxxxx xx xxxx xxx xxxxxx xxxxxxx xxxxxx
```

The open central moire'-channel, visible to anyone, has no purpose and detracts from readability. It is relatively easy to jitter the inter-word spacing to eliminate the central moire' channel, but care must be taken to avoid straightening one or more of the other moire-channels, which are barely discernable near the right margin, or opening a new moire'-channel. Note also a small diamond-shaped moire'-glyph at center-right. The eye may even trace a moire-maze about the printed page.

In Proportional Character Space mode, PCS word-widths will vary dramatically, but there will occur a similar number of inter-word spaces, with similar channeling. The inter-word spaces may be jittered proportionally, making it possible to eliminate channels simply by altering some inter-word spaces from 20-pixel width to 24-pixel width (or the reverse) and altering some other inter-word spaces in the same line to 16-pixel width. Doing this on each of two or three lines may eliminate the moire-channel, but sometimes this does not work well, particularly with sequences of long words. The solution is "pixellation." Individual sequences of letters may have well-known pairs, such as "tt" and "ff" which should not be disturbed. Other sequences, such as the "li" in the word "lines," may have a column of white pixels added between the "l" and "i" and also between the "i" and the "n," without disturbance to legibility or appearance. It is even possible to pixellate the character itself. For example, the character "m" may become a slightly wider "m" without disturbance;

yet taking one pixel column less horizontal space, so long as the outside pedestals and central pedestal remain unaffected. Such intra-character or inter-character manipulation may be termed "pixellation."

There may be a number of rules required for pixellation of various characters in various typefonts, to avoid confusing distortion of characters, but the elimination of moire'-channels and moire'-glyphs will generally more than pay for such minor increase of rules, or even for minor confusion. If not, a simple kill switch in the program might give the typesetter full control. A more sophisticated control, however, is to change the number of lines monitored, for example from four to seven, or from seven to five, to give the typesetter another look. Another sophisticated control is to eliminate black pixellation, or to eliminate white-pixellation, or to favor inter-word space manipulation over pixellation by plus or minus 1, 2 or 3 pixel widths.

Implementation

The FIGURE shows typical implementation, in a computer. The typesetter, who may also be the author, operates computer 1, which includes keyboard 2 and internal capabilities shown diagrammatically in cloud 3. Computer 1 has a viewscreen 4 which may include a toolbar 5. Computer capabilities include:

a) input means, such as keyboard 2, to develop a text portion having lines of text aggregating visually readable patterns having words and inter-word spaces subject to text-moire' effects;

b) text accumulator means A, shown as box 6, responsive to the input means, to store several lines of text and inter-word spaces;

c) moire'-effect detection means D, shown as box 7, to review the content of text accumulator means A, to develop a virtual moire' prediction pattern;

d) control means C, shown as box 8, inter-relating the input means, text accumulator means A and moire'-effect detection means D;

e) text manipulation means M, shown as box 9, responsive to the moire'-effect detection means D and control means C, to alter the pixel patterns of individual characters and individual inter-word spaces in the virtual moire' prediction pattern to minimize undesirable text-moire' effects; and f) output means B, shown as box 10, responsive to the control-means 8, the text accumulator means 6 and the text manipulation means M, to present as a visually-readable pattern a text closely-related to the preliminary text having minimized text-moire' effects.

Controls.

Operator controls, which typically will be selected from a toolbar pull-down, may include the following options:

Pageview,

Easyfix,

Negative/Positive,

Moire'-Effect Highlight,

Moire'-Blush,

Moire'-Finesse,

Inter-Character Spacing,

Intra-Character Spacing,

Selective Scrolling with Typesetter Interaction, and

Unselect

The procedures for control options may be selected individually or in combinations, as follows:

Pageview

The first control is "Pageview." Pageview gives the typesetter another look before continuing to process text for moire'-effect elimination. Pageview may be enhanced by graying or coloring text areas having no system-detected moire'-effects, or by highlighting system-detected moire'-effects.

Easyfix

The Easyfix option may be as simple as selecting a line of text which appears to the typesetter to be critical to the observed moire'-effects, and causing manual or system jittering of the inter-word spacing. This may be accomplished by introducing or eliminating incremental white pixel columns to selected inter-word spaces, using a mouse-directed cursor and + or − keys with immediate display of the changing text. A skillful typesetter can do this in a significant percentage of situations, without resort to intra-character or inter-character pixellation.

Negative/Positive

The typesetter may find it comfortable to toggle the screen presentation from positive to negative and back, which may make moire'-text patterns more easily discernible.

This control mode can expand the inter-character spacing by 1 pixel-column or 2 pixel-columns, or selectively by 0, 1 or 2 pixel-columns depending upon the character or sequence of characters. For example, it may be acceptable to add a pixel-column to the inter-character spacing between consecutive "d" characters, but not to add a pixel-column between consecutive "f" characters.

Moire'-Effect Highlight

Moire'-effect detection means 7, reviewing the content of text accumulator means 6 develops a virtual moire' prediction pattern and causes highlighting of the pattern on screen 4. In interactive mode, Moire'-effect detection means 7 can quickly calculate the effect of changes which the typesetter keys in, and show the result so that the typesetter can either abort or accept the changes.

Moire'-Blush

Moire'-effect detection means 7, reviewing the content of the text accumulator means 6 develops a virtual moire' prediction pattern including portions of the screen which are free of moire'-text, and fades the free text portions, leaving a blushing bright pattern of text with the moire'-patterns highlighted and a limited amount of the surrounding text normal.

Moire'-Finesse

Skilled typesetters may also activate a "Moire'-Finesse" routine. In this mode, the typesetter depends upon the system to preserve the current text, but simultaneously allows manipulation by the typesetter. Such manipulation may be by introducing or deleting articles such as "a," "an" and "the" or by substitution of synonyms for certain words. For example, a text paragraph riddled with moire'-effects might be visually improved by changing the text from:

"The seven sisters smiled serenely." to

"Never did seven sisters smile so serenely."

Then, assuming the typesetter has authority from the author to make such changes, the visual presentation, if not the story flow, is quickly improved.

Selective Scrolling with Typesetter Interaction

Still another sophisticated control is a selective scroll. When called upon by the typesetter, the system temporarily adds a generalized one or two moire'-effect-free paragraphs to complete the page, and presents a sequence of differing system-prepared solutions for viewing. The typesetter interacts by selecting the best, using a plus or minus or = key to preserve his review. Typically, the first alternative is keyed "=," with additional alternatives compared and assigned "+" or "−." Note that text discussion here assumes that characters are formed from selected black pixels in a row/column raster. Inter-character spaces and inter-word spaces are assumed to be white. Other colorations may replace white as background, and other colors, including white, may be used as the character colors.

Selective scrolling may be carried out on the basis of black-spots instead of actual characters, to make the white moire'-effects stand out more clearly. A sub-variant to selective scrolling alternates positive and negative presentation of text and background, which is another way to emphasize the moire'-effects. A further sub-variant, called "blush," causes graying of spaces which are so surrounded by characters that they cannot participate in moire'-effects. This emphasizes the actual moiré-effects.

Intra-Space and White/Black Manipulation

Another typesetter-selection control is to select globally, or for a particular line, to eliminate or minimize black pixellation or white pixellation, or to eliminate or minimize white-pixellation, or to favor intra-space manipulation over intra-character or inter-character pixellation by plus or minus 1, 2 or 3 pixel widths. This can be accomplished by toolbar control or by knobs.

Intra-Character Manipulation

The control may be additionally selected to display the individual character expanded to show actual pixels or groups of pixels. The typesetter may highlight a pixel or pixel group for manipulation, The preferred interactive mode is to select a pixel (or pixel group) and delete or replicate the selected pixel column. If desired, the system can recommend or even accomplish intra-character manipulation, according to established protocols and standard hierarchy of choice. In a likely hierarchy, manipulation of wide characters such as "m" and "w" would take precedence over narrow characters such as "i" and "j" for manipulation.

Unselect

Still another variant is the "unselect." The typesetter points to a moire'-effect with a mouse-driven cursor, and by keying "+" of "−" implements a decision whether to accept the particular moire'-effect as benign, or whether to proceed with an amelioration procedure.

Details of Computer Implementation

A preferred computer implementation is to maintain a digital listing of coordinates of inter-word (white) spaces in print text.

These coordinates, simplified to row and column for convenience in discussion, might be:

A07, A10, A14, A22, A25 B04, B07, B10, B19, B22, B27 C06, C10, C13, C17, C22, C29 D05, D10, D16, D19, D22, D27

In a first scan, for vertical text-moire', each coordinate is compared for equal column number and adjacent row number to determine whether it fits into one or more vertical pairs.

A07=B07, A10=B10=C10=D10, A22=B22=C22=D22 fit the vertical pairs criterion.

Then check for strings of multiple vertical pairs, the multiple being at least a selected multiple, such as three.

The pairs A07, B07, A10, B10, C10, D10, A22, B22, C22, D22 fit the string-multiple criterion and exceed the threshold three.

There may be text-moire' anomalies which are more complex, such as glyphs and diagonals. Glyphs are highly subjective, but humans are very good at characterizing glyphs such as diamonds, circles, and even animal figures. The computer glyph finding capability may be as simple as a space count per unit area of text, with presentation to the typesetter if the space count is greater than a pre-set threshold, such as 20%. The glyph finding capability may also be "taught" and may be quite personalized. One typesetter may accept all glyphs; another typesetter may hate ovals, particularly in a favorite typefont. Character recognition techniques may be used. Diagonals are another matter. Diagonal text-moire' may be even more disconcerting than vertical text-moire', since they divert the reader's eye toward the edge of the page. Diagonals in the example given above have coordinates within a threshold (threshold two is selected for discussion) distance from the inter-word space in the preceding line. In the example given, inter-word spaces fitting the diagonals criterion are shown in bold type, as follows:

|      |           |          |      |
|------|-----------|----------|------|
| A07, | A10, A 14, | A22, A25, | B04, |
| B07, | B10, B19,  | B22,     | B27  |
| C06, | C10, C13, C17, | C22, | C29, |
| D05, | D10, D16, | D19, D22, | D27 |

Note that the vertical may merge into the diagonal. If the criterion is changed to "diagonals-only" then the result is:

|      |           |          |      |
|------|-----------|----------|------|
| A07, | A10, A 14, | A22, A25, B04, |
| B07, | B10, B19, | B22, | B27 |
| C06, | C10, C13, C17, | C22, | C29, |
| D05, | D10, D16, | D19, D22, | D27 |

There may also be a string-length threshold of three rows, which changes the result to:

|      |           |          |      |
|------|-----------|----------|------|
| A07, | A10, A 14, | A22, A25, B04, |
| B07, | B10, B19, | B22, | B27 |
| C06, | C10, C13, C17, | C22, | C29, |
| D05, | D10, D16, | D19, D22, | D27 |

The techniques for detecting text-moire' are not particularly exciting to a computer specialist, since they involve simple computations and a great deal of housekeeping. The housekeeping volume goes up as the storage and computation descend to the pixel-column level and even the pixel-row level if glyphs are a concern, but modern computers have more than adequate storage capacity.

Deliberate Glyphs

Certain human activities involve the desire to print a message-on-message either for fun, security or for encryption. Placement of deliberate glyphs for encryption is not recommended, because the human eye is an excellent decryption mechanism, particularly when the human brain is alerted. Glyphs for security, however, may be another matter and there is no stopping the human capacity to use sophisticated computation engines for fun. Suffice here to state that the deliberately-produced text-moire' is within the capability of the same equipment which is normally used to eliminate unwanted text-moire'. Color manipulations similar to the color-blindness tests add another dimension of fun, particularly if color filters, either optical or computerized, are used. The result may be a puzzle, or may be a diagnostic tool, or may have other uses such as in map-making, where multiple dimensions are shown symbolically or where unobtrusive captions are desired.

Changes to the control modes, and various permutations of multiple control modes, may be used within the spirit and scope of the invention.

I claim:

1. A typesetting system, for preparing text as pixel patterns with minimized text-moire' effects, comprising
    a) input means to develop a text portion having lines of text aggregating visually readable patterns having words and inter-word spaces subject to text-moire' effects;
    b) text accumulator means, responsive to said input means, to store a plurality of lines of text and inter-word spaces;
    c) moire'-effect detection means to review the content of said text accumulator means, to develop a virtual moire' prediction pattern;
    d) control means inter-relating said input means, said text accumulator means and said moire'-effect detection means;
    e) text manipulation means, responsive to said moire'-detection means and said control means, to alter the pixel patterns of individual characters and individual inter-word spaces in said virtual moire' prediction pattern to minimize undesirable text-moire' effects; and
    f) output means responsive to said control means, said text accumulator means and said text manipulation means, to present as a visually-readable pattern a text closely-related to said preliminary text having minimized text-moire' effects.

2. A typesetting system according to claim 1, wherein said control means comprises selective scrolling means providing a sequence of text presentations for interactive review and selection by the typesetter.

3. A typesetting system according to claim 2, wherein said text presentations are presented with enhanced contrast of moire'-effects from other text.

4. A typesetting system according to claim 3, wherein said text presentations are presented with enhanced contrast of moire'-effects from other text by alternative negative and positive presentations of foreground and background color.

5. A typesetting system according to claim 1, wherein said control means provides for a "finesse" routine by saving a text presentation and presenting a working duplicate text presentation for interactive manipulation, with opportunity for the typesetter to return to the saved text presentation or to replace the saved presentation with the working duplicate after manipulation to minimize moire'-effects.

6. A typesetting system according to claim 1, wherein said control means comprises interactive means permitting selective scrolling with system-presented selections for typesetter review and selection.

7. A typesetting system according to claim 1, wherein said control means comprises selection means favoring background pixellation at the inter-character level.

8. A typesetting system according to claim 1, wherein said control means comprises selection means favoring foreground pixellation at the intra-character level.

9. A typesetting system according to claim 1, wherein said control means comprises selection means using foreground pixellation at the intra-character level, background pixellation at the inter-character level, and background pixellation at the inter-word level.

* * * * *